UNITED STATES PATENT OFFICE.

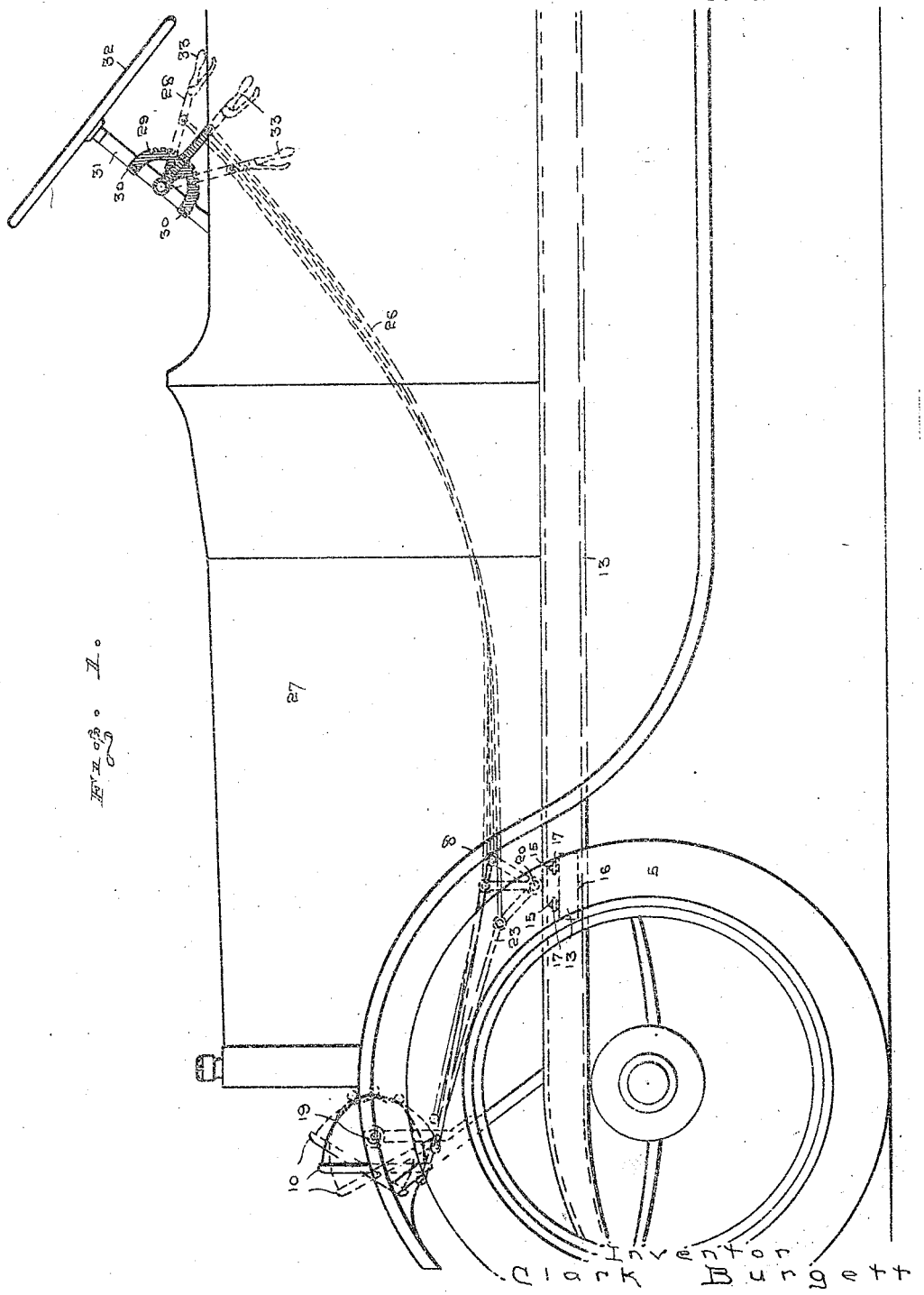

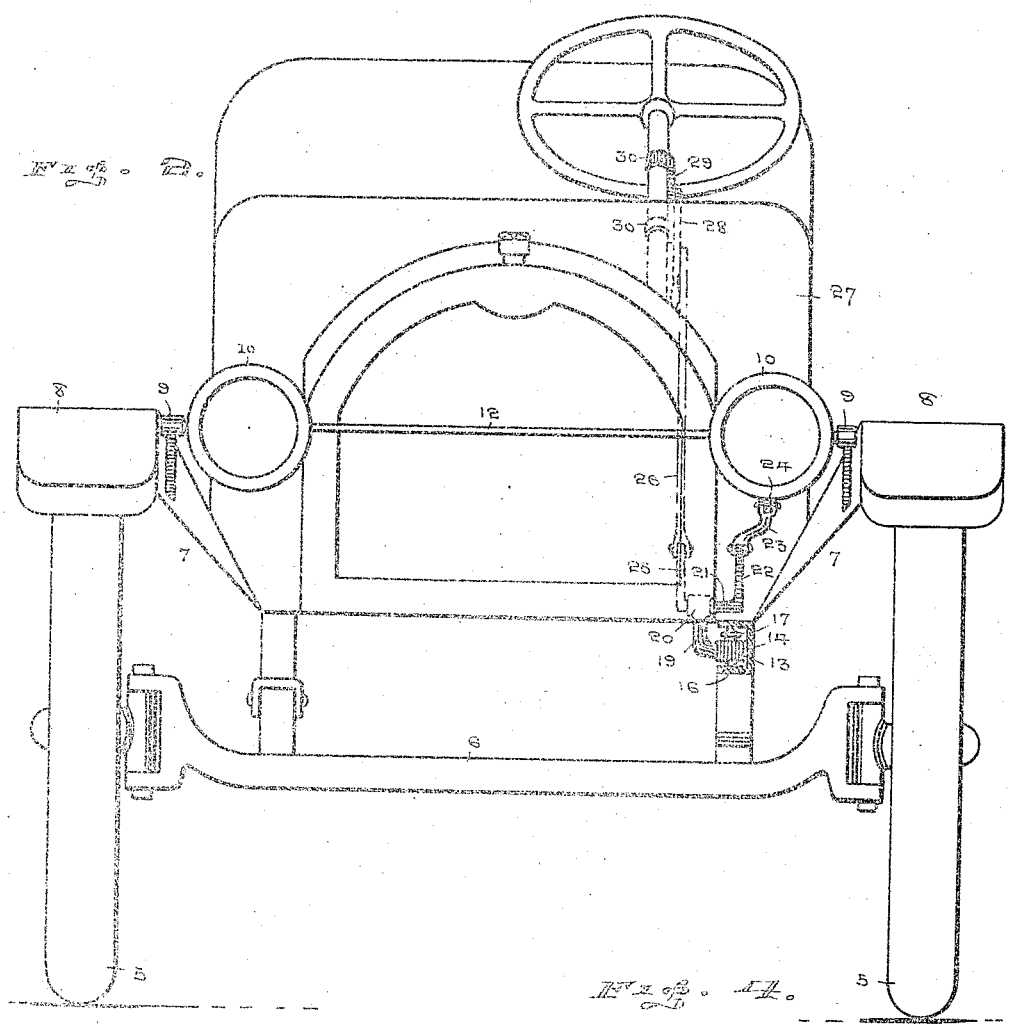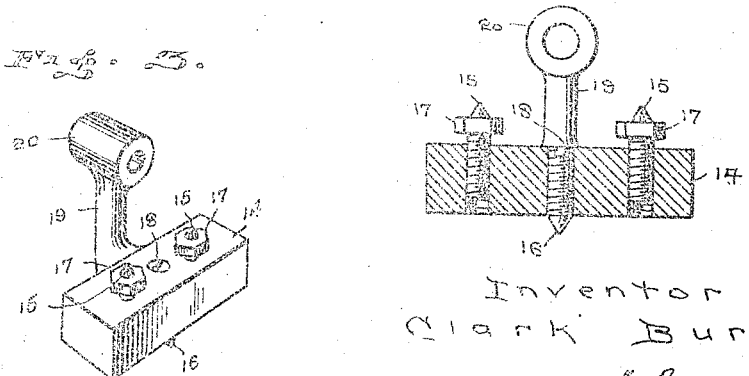

CLARK BURGETT, OF ANACORTES, WASHINGTON, ASSIGNOR OF ONE-HALF TO EDMUND E. HAUGEN, OF ANACORTES, WASHINGTON.

HEADLIGHT.

1,277,190.   Specification of Letters Patent.   Patented Aug. 27, 1918.

Application filed August 25, 1917. Serial No. 188,108.

*To all whom it may concern:*

Be it known that I, CLARK BURGETT, a citizen of the United States, residing at Anacortes, in the county of Skagit and State of Washington, have invented certain new and useful Improvements in Headlights; and I do hereby declare the following to be a full, clear, and exact description of the invention, such as will enable others skilled in the art to which it appertains to make and use the same.

My invention relates to head lights for automobiles or other vehicles and has for its object to provide simple and economical controlling means for headlights easily mountable on any make of car without boring holes or otherwise mutilating the car, such means operable by hand by a person seated at the steering wheel without the necessity of stooping or using the feet, and serving to throw the rays of light as desired to illuminate the road bed, signboards and the like.

With this object in view the invention consists in the improved construction, arrangement and combination of parts hereinafter fully described and afterward specifically claimed.

In order that the construction and operation thereof may be readily comprehended, I have illustrated an approved embodiment of my invention in the accompanying drawings and will now proceed to fully describe the same in connection with said drawings, in which Figure 1 represents, in side elevation, the forward part of an automobile equipped with my headlight controlling means, parts being indicated in dotted lines.

Fig. 2 represents a front elevation of the same, parts being shown in section and parts in dotted lines.

Fig. 3 represents, in perspective, the block to be secured to the car to support the controlling means.

Fig. 4 represents the parts illustrated in Fig. 3, in sectional elevation.

Like reference characters denote the same parts in all of the figures of the drawings.

Referring particularly to the drawings, 5, 5, indicate the ordinary front wheels, 6, the front axle, 7, the fender supports, 8 the fenders, and 9, the headlight supports in which the headlight 10, 11, are pivotally and centrally supported and balanced, the headlights being rigidly connected by a bar 12 whereby they will move in unison, the supports 9 being preferably provided with ball bearings, all of these parts being of usual construction in many makes of cars.

At 13 is indicated a frame of angle iron, forming part of the car, the inner vertical face of which is open, and within this frame, approximately in line with the upper rear edge of the wheels, is a supporting block 14 which is adjustably held in position in the frame by two upwardly extending, pointed screws 15, 15, and one downwardly extending, pointed screw 16, the screws 15, 15, being threaded into the block 14 near its ends, and provided with angular heads 17 to receive wrenches, and the screw 16 being threaded into the block substantially midway between the screws 15, 15, and being provided with a slot 18 to receive a screwdriver, such angular heads and slot being adaptable to any or all of the screws, at will. The points of the screws are preferably of hard tool steel so that when the screws are properly adjusted, the block may be placed in the frame, vertically adjusted and rigidly held by said points engaging the bottom and the top of the frame.

Projecting laterally from the inner side of the block 14 is the horizontal arm of a right angular bar 19 which has a vertical arm finished at its upper end as a transverse bearing 20 in which is pivotally mounted the horizontal cross bar 21 of a substantially U-shaped frame, to one upwardly projecting arm 22 of which is pivotally connected a link 23, which, at its rear end is pivotally connected to an eye 24 upon the lower surface of the headlight 10.

To the other upwardly projecting arm 25 of the U-shaped frame is pivotally connected the rear end of a rod 26 which extends forward through the hood 27 and at its forward end is pivotally connected to a lever 28, which is pivotally connected at its inner end on a horizontal pivot in the center of a semi-circular rack 29, the latter having its ends 30 bent around the steering post tube 31, below the steering wheel 32, thus securing the rack in a vertical position. The lever 28 is provided with a pawl 33 to engage the teeth of the rack to hold the lever and its connections in any positions to which they may be moved, the movement of the lever being vertical, just below the steering wheel and very handy to the operator.

The bearing 20 may also be a ball bearing, if desired.

When the lever 28 is in its middle position, as seen at the right of Fig. 1, the headlights will be in their middle positions, as seen at the left of Fig. 1, and the rays of light will be projected forward in a substantially horizontal plane, but by pulling the lever 28 to its upper position, the headlight will be tilted to throw the rays of light downward at an angle, while the movement of the lever to its lower position will tilt the headlight to a position to direct the rays at an angle upwardly, the two headlights moving in unison by reason of their rigid connection by the bar 12.

The simplicity of construction, and the ease of operation of my invention will be apparent from the foregoing and I desire it to be understood that slight changes and variations from the construction and arrangement of the parts as described may be made without departing from the spirit and scope of the invention.

Having thus fully described my invention, what I claim as new and desire to secure by Letters Patent of the United States, is:

1. The combination of a vehicle provided with a head light pivotally mounted to tilt in a vertical plane, a block secured upon the frame of said vehicle and formed with a horizontal bearing, a U-shaped frame having its horizontal arm journaled in said bearing, a connection extending from one of the end arms of said frame to said head light, and a connection extending from the other arm of said frame to means for oscillating the frame to effect the tilting of the head light.

2. In combination, a frame of angle iron at the side of a vehicle having its inner face open, a block adjustably secured in said frame, a horizontal bearing supported by the block, a U-shaped frame having its horizontal arm journaled in said bearing, two arms projecting upwardly from the horizontal arm, headlights pivoted to tilt in vertical planes, connections between one upwardly projecting arm and the headlights, and means connected with the other upright arm for tilting the headlights.

3. In combination, a frame of angle iron at the side of a vehicle having its inner face open, a block in said frame having vertically arranged, pointed screws to engage the upper and lower inner surfaces of the frame, a right angle bar having a horizontal arm secured to the block and projecting out of the open face of the frame and a vertical arm carrying a transverse bearing at its upper end, a U-shaped frame having its horizontal arm in said bearing, tilting headlights, means connecting one upright bar of the U-shaped frame with the headlights, a steering wheel and post, and connections between the other upright arm of the U-shaped frame and said post.

In testimony whereof I have signed my name to this specification in the presence of two subscribing witnesses.

CLARK BURGETT.

Witnesses:
J. F. LYONS,
W. H. McCALLUM.